United States Patent
Haimer et al.

(10) Patent No.: US 8,821,085 B2
(45) Date of Patent: Sep. 2, 2014

(54) TOOL HOLDER FOR CLAMPING TOOLS BY SHRINK FIT

(75) Inventors: Franz Haimer, Igenhausen (DE); Wolfgang Kugle, Aichach-Griesbeckerzell (DE)

(73) Assignee: Haimer GmbH, Igenhausen (DE)

( * ) Notice: Subject to any disclaimer, the term of this patent is extended or adjusted under 35 U.S.C. 154(b) by 1404 days.

(21) Appl. No.: 12/065,976

(22) PCT Filed: Sep. 7, 2006

(86) PCT No.: PCT/EP2006/008740
§ 371 (c)(1),
(2), (4) Date: Sep. 16, 2008

(87) PCT Pub. No.: WO2007/028616
PCT Pub. Date: Mar. 15, 2007

(65) Prior Publication Data
US 2009/0033043 A1  Feb. 5, 2009

(30) Foreign Application Priority Data

Sep. 9, 2005  (DE) .............. 20 2005 014 350 U

(51) Int. Cl.
| | |
|---|---|
| *B23C 5/00* | (2006.01) |
| *B23C 5/28* | (2006.01) |
| *B23B 31/117* | (2006.01) |
| *B23Q 11/10* | (2006.01) |
| *B23P 11/02* | (2006.01) |
| *B23B 31/02* | (2006.01) |
| *B23B 31/00* | (2006.01) |

(52) U.S. Cl.
CPC ............ *B23B 31/02* (2013.01); *B23B 31/028* (2013.01); *B23C 5/00* (2013.01); *B23C 5/28* (2013.01); *B23Q 11/10* (2013.01); *B23B 31/006* (2013.01); *B23B 2240/32* (2013.01); *B23P 11/027* (2013.01); *B23B 31/1179* (2013.01); *B23B 2231/24* (2013.01); *B23B 2260/0725* (2013.01); *B23B 2265/08* (2013.01)
USPC ............ 409/234; 409/136; 409/218; 408/56; 408/241 S; 279/102; 279/156

(58) Field of Classification Search
CPC ............. B23B 31/1179; B23B 31/006; B23B 2260/0725; B23P 11/027
USPC ................. 409/234, 232, 135–136, 141, 218; 408/238, 239 R, 239 A, 240, 143, 241 S, 408/56; 279/102, 103, 156; 29/447; 407/11
See application file for complete search history.

(56) References Cited

U.S. PATENT DOCUMENTS

| | | | | |
|---|---|---|---|---|
| 4,795,292 A | * | 1/1989 | Dye | 409/234 |
| 5,311,654 A | * | 5/1994 | Cook | 29/447 |
| 6,315,506 B1 | * | 11/2001 | Mizoguchi | 409/234 |
| 6,322,299 B1 | * | 11/2001 | Hartman | 409/141 |

(Continued)

FOREIGN PATENT DOCUMENTS

| | | |
|---|---|---|
| DE | 19944440 | 4/2001 |
| DE | 20200298 | 4/2002 |

(Continued)

OTHER PUBLICATIONS

Machine Translation of JP 2005-161502, which JP '502 was published Jun. 2005.*

(Continued)

*Primary Examiner* — Erica E Cadugan
(74) *Attorney, Agent, or Firm* — Price Heneveld LLP

(57) ABSTRACT

The invention relates to a tool holder (1) for clamping tools by shrink fit. The tool holder, due to its specific shaping in the area of the shrink-fit head (6) and the shrink-fit base (5) of the tool holder, is less prone to oscillate than known tool holders, therefore allowing inter alia higher speeds so that the cutting capacity, determined by the speed of the tool, the tool feed and the cutting depth of the tool, can be increased and the machine running times required to produce a workpiece can be reduced. The tool holder (1) of the present invention allows to produce and machine workpieces in a substantially more efficient and economical manner.

13 Claims, 3 Drawing Sheets

(56) References Cited

U.S. PATENT DOCUMENTS

| | | | |
|---|---|---|---|
| 6,339,868 B1 * | 1/2002 | Nagaya et al. | 409/234 |
| 6,481,940 B2 * | 11/2002 | Prust et al. | 409/233 |
| 6,511,077 B1 * | 1/2003 | Voss et al. | 279/102 |
| 6,595,528 B2 * | 7/2003 | Voss | 279/102 |
| 7,367,763 B2 * | 5/2008 | Ruy Frota de Souza | 409/234 |
| 2003/0228199 A1 * | 12/2003 | Matsumoto et al. | 409/141 |
| 2007/0059117 A1 * | 3/2007 | Haimer et al. | 409/234 |
| 2007/0252344 A1 * | 11/2007 | Retzbach | 279/55 |
| 2011/0198818 A1 * | 8/2011 | Haimer | 279/103 |
| 2011/0248455 A1 * | 10/2011 | Haimer et al. | 279/9.1 |
| 2011/0255932 A1 * | 10/2011 | Cook et al. | 29/447 |

FOREIGN PATENT DOCUMENTS

| | | | |
|---|---|---|---|
| DE | 10114149 | | 10/2002 |
| DE | 20200398 U1 | | 6/2003 |
| DE | 102004019869 | | 8/2005 |
| EP | 1529584 | | 5/2005 |
| GB | 1093488 A | * | 12/1967 |
| JP | 63-251143 A | * | 10/1988 |
| JP | 2001-105208 A | * | 4/2001 |
| JP | 2001-353634 A | * | 12/2001 |
| JP | 2005161502 A | * | 6/2005 |

OTHER PUBLICATIONS

Machine Translation of JP 2001-105208, which JP '208 was published Apr. 2001.*

International Search Report, Jul. 9, 2006, 5 pages.

* cited by examiner

TOOL HOLDER FOR CLAMPING TOOLS BY SHRINK FIT

FIELD OF THE INVENTION

The present invention relates to a tool holder for clamping tools by shrink fit, preferably comprising cylindrical shafts.

BACKGROUND OF THE INVENTION

Tool holders are used for clamping turning-, drilling-, reaming-, grinding-, and milling tools, and comprise a shrink fit chuck, which comprises a clamping section with an axial inner bore hole, in which the shaft of the tool can be mounted by shrink fit.

During the shrink fit process, the clamping section, whose inner bore hole comprises a slightly smaller inner diameter than the exterior diameter of the tool shaft, is expanded by heating, preferably by means of an induction coil, and cooled again after inserting the tool shaft, whereby a torque proof connection is established between the tool shaft and the shrink fit chuck.

Known embodiments of such tool holders, like e.g., shown in DE 199 44 440 C2 and DE 101 14 149 C2, already comprise very good vibration damping and torsion stability. However, they still comprise the risk that they become susceptible to vibration, in particular when used with extremely fast rotating tools, whereby the tool can perform a more or less oscillating movement about the longitudinal axis of the tool holder during its rotation, which can degrade the precision and reproducibility of the work pieces manufactured therewith. In order to still provide a high precision and reproducibility in spite of this, such tools must not be used with extremely fast rotation and also the feed and the cutting depth must not be selected too large. This way, however, the stock removing capacity is suboptimal; this means the machine running time per work piece produced is suboptimal.

Such tool holders, however, do not only have disadvantages with fast rotating tools. Also with non-rotating tools, deflections of the tool from the tool holder axis and vibrations can be caused by the impact of the work piece to be machined, which also degrade the precision of machining.

Other tool holders with shrink fit chuck are described in DE 202 00 298 U1 and DE 10 2004 019 869 A1 in the form of a telescoping tool holder, or as an additionally clamped tool holder. While tools can be held by the telescoping tool holder, on the one hand far away from the particular coupling, and on the other hand through deep and slender openings, extensive vibration compensation is possible with the additionally clamped tool holder. The first tool holder does not provide any dedicated vibration damping and the vibration damping of the second tool holder is configured rather complicated and technically complex.

SUMMARY OF THE INVENTION

Thus, it is an object of the present invention to provide a tool holder for clamping tools by shrink fit, which has low vibration propensity and thus allows higher cutting performance.

A tool holder according to one aspect of the present invention is characterized by a contour of the shrink fit chuck, wherein the diameter of the shrink fit chuck is discontinuously increased between a first front diameter at the head of the shrink fit chuck and a second rear diameter at the base of the shrink fit chuck, so that at least two contour sections of the shrink fit chuck are formed. The transition between an end section and a base section, in which the diameter increases discontinuously, also defines the transition between the head of the shrink fit chuck and the base.

Through this particular shape, the head of the shrink fit chuck is not only more slender than the base, but also comprises much less mass, which could, for example, cause and increase vibrations, when the tool holder rotates very quickly. Such a tool holder can thus be operated at much higher speeds than conventional tool holders, wherein work pieces with very good precision and reproducibility can be produced due to the reduced propensity for vibrations. By providing the base of the shrink fit chuck with thicker walls than the head, not only the standard requirements with regard to the configuration of the tool holder are complied with, which result from the geometric configuration of the interface between the machine tool and tool holder, but a sufficient stiffness of the shrink fit chuck is also provided simultaneously.

In one embodiment, the receiver of the tool shaft comprises an axial stop, which is used for defining the axial position of the tool shaft within the receiver; this means it defines the penetration depth of the tool shaft into the shrink fit chuck. With respect to the transition, the axial stop is disposed, so that the tool shaft is completely received in the head of the shrink fit chuck, and does not partially protrude into the base of the shrink fit chuck. In other words, the axial stop shall be disposed at the elevation of the transition, or between said transition and the front end of the shrink fit chuck, and not in the portion between the transition and the lower end of the shrink fit chuck. By means of this particular axial arrangement of the axial stop with reference to the transition, on the one hand, a particularly advantageous ratio between the head of the shrink fit chuck, which is reduced in mass, and the base of the shrink fit chuck, which is increased in stiffness, is achieved. On the other hand, the shrink fit chuck can, for example, be heated by an induction coil without problems, wherein the induction coil does not need to have a complicated geometry. Furthermore, this way of heating, which is as even as possible, and an expansion of the head of the shrink fit chuck is facilitated, since similar wall thickness are provided in all portions of the clamping section, which avoids an uneven heating and expansion of the clamping section.

The end section can comprise a conical contour, which extends continuously between the front end of the shrink fit chuck head and the transition and whose diameter expands towards the transition at an angular range of 1° to 20°, in particular 4.5°, with reference to the longitudinal axis of the tool holder. Through this geometric configuration of the head of the shrink fit chuck, the tool holder is compatible with all current shrinking devices.

The expansion of the diameter of the contour of the shrink fit chuck in the transition portion can change abruptly from 0° with reference to a line perpendicular to the longitudinal axis of the tool holder up to 50°. A range of 10° to 40° is preferred, wherein the transition preferably expands at 30°.

The base section can follow after an expansion section towards the lower end of the base of the shrink fit chuck, which abuts to the center piece of the tool holder, wherein said base section comprises a substantially cylindrical contour, wherein the expansion section comprises a substantially conical contour, which expands towards the base section at an angle with reference to the longitudinal axis in the range of 1° to 20°, in particular 6°, in a tool holder with hollow shaft couplings, and at 8° in a tool holder with steep cone shaft coupling. Thus, the contour transition between the expansion and the base section occurs substantially continuously, wherein however also discontinuous transitions are possible. Thus, the base abutting to the center piece of the tool holder comprises a contour determined by a standard, while the portion between the base section and the transition is additionally reduced in wall thickness due to the conical contour, whereby the shrink fit chuck is further reduced in its mass. Thereby, the vibration propensity of the tool holder is additionally reduced.

In particular in tool holders comprising long shrink fit chucks, the portion of the shrink fit chuck can have a contour, which is configured in four sections, thus the end section, an intermediate section, which is substantially cylinder shaped and disposed adjacent to the transition, and subsequent to that, the conically expanding expansion section, and in turn subsequent to that, the substantially cylindrical base section, which is connected to the center section and which complies with standard requirements. Thus, the conical contour of the expansion section can expand at an angle with reference to the longitudinal axis of the tool holder in a range of 1° to 20°, in particular at 6° for a tool holder with a hollow shaft coupling, and at 8° for a tool holder with a steep cone shaft coupling, wherein the contour transitions between the intermediate and the expansion, and the base section substantially extend continuously, wherein however also non-continuous transitions are possible. By this four section contour, the mass of the base of the shrink fit chuck is additionally reduced with respect to a three component contour.

In another embodiment, the intermediate section comprises bore holes, into which the balancer elements (for example, balancer bolts) can be inserted, which are used for accomplishing smooth running by preventing imbalances of the tool holder.

For cooling the tool, while machining the work piece, an axial inner bore hole is provided in the interior of the tool holder, which feeds a coolant to the tool, or to the location, where the tool engages the work piece. The feed channel can comprise a relatively small diameter, compared to the exterior diameter of the shrink fit chuck, in particular in the range of 3 mm to 6 mm. By means of this relatively small diameter, the bore hole is also advantageous for the vibration properties and for the stability of the tool holder, whereby a sufficient stiffness of the tool holder is still maintained.

The coolant supplied through the axial feed channel can on the one hand be directly supplied through an axial inner bore hole through the tool to the location, where the tool engages the work piece, and can thus cool the tool on the inside at the same time, and/or one or several bore holes are provided in the wall of the shrink fit chuck, which receive the coolant from the supply channel and feed it next to the tool shaft in the tool holder wall, so that the coolant exits from the head of the shrink fit chuck alongside the tool. On the other hand, the coolant conduits can also be left away in order to increase stiffness.

Further characteristics, features and advantages of the present invention become apparent with reference to the description of a preferred embodiment in conjunction with the figures.

DETAILED DESCRIPTION OF THE PREFERRED EMBODIMENT

Figure 1:
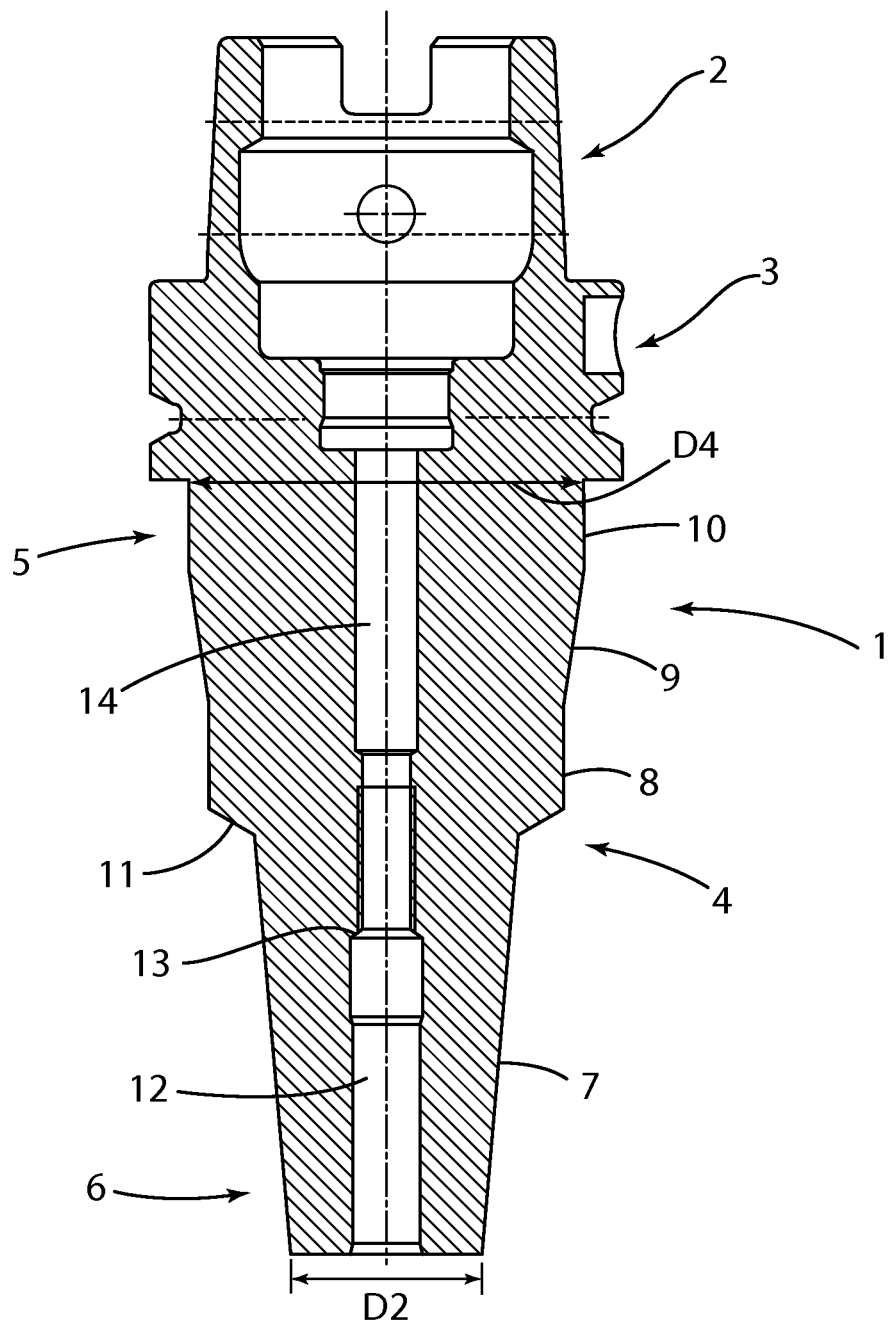
FIG. 1 illustrates a longitudinal sectional view of a preferred embodiment of a tool holder.

FIG. 1 illustrates a tool holder 1 in a longitudinal cut view, wherein said tool holder is provided in one piece and comprises a hollow shaft coupling 2, a center portion 3, and a shrink fit chuck 4. The shrink fit chuck 4 comprises a shrink fit chuck base 5, which adjoins to the center section 3 with its lower portion and a shrink fit chuck head 6. The four section contour of the shrink fit chuck 4 is easily recognizable, which comprises a first conical section 7, a second cylindrical section 8, a third conical section 9, and a fourth cylindrical section 10. These sections 7, 8, 9, 10 comprise the substantially rotational symmetrical contour of the shrink fit chuck 4, starting with a front diameter D2 of the shrink fit chuck head 6 to the rear diameter D4 of the shrink fit chuck base 5.

The contour of the diameter of the tool holder extends substantially smooth in the particular sections 7, 8, 9, 10 and steady between the sections 8, 9, 10, wherein the diameter of the shrink fit chuck 4 continuously expands, starting at the front diameter D2, towards the rear diameter D4, and only remains substantially constant in the second and fourth section 8, 10. Between the first and the second section 7, 8, the diameter in the transition portion 11 increases discontinuously, which means the contour diameter is not steady in the transition from the first section 7 to the second section 8.

As a consequence of the transition 11, the shrink fit chuck base 5 has a much greater wall thickness than the shrink fit chuck head 6, whereby the shrink fit chuck head 6 does not only appear slimmer, but also has a lower mass, compared to a shrink fit chuck head 6, whose contour would be steady, starting at the shrink fit chuck base 5.

Through these measures, the vibration propensity of the tool holder 1 is substantially reduced, since less mass is disposed far away from the mounting point of the tool holder 1 in the machine tool, and more mass is disposed close to this mounting point. Simultaneously, the tool holder shown in FIG. 1 comprises a sufficient stability and complies in particular with standard requirements, which determine, for example, the maximum diameter of the base section 10.

The shrink fit chuck head 6 comprises a clamping section in its front portion, wherein said clamping section is characterized by an axial inner bore hole 12 for receiving the tool shaft. The axial penetration depth of the tool shaft into the axial inner bore hole 12 is determined by an axial stop 13, which is configured in the form of a radial contraction of the inner bore hole 12. Through the axial stop 13, the tool shaft is only disposed in the shrink fit chuck head 6, and not in the shrink fit chuck base 5 in clamped condition, whereby the shrinking fitting process is substantially simplified and facilitated.

Subsequent to the axial stop 13, a feed channel 14 is disposed, which is also comprised as an axial inner bore hole and feeds coolant to the tool shaft, shrunk into the inner bore hole 12. The feed channel 14 thus comprises a rather small diameter, compared to the exterior diameter of the shrink fit chuck 4, which is in the range of 3 mm to 6 mm. This relatively small bore hole also facilitates the advantageous vibration properties and a high stability of the tool holder.

The coolant can either be fed to the tool head and to the work piece through a coolant channel, axially disposed in the interior of the tool, and/or 6 bore holes (not shown) can be provided in the shrink fit chuck head, which feed the coolant starting at the feed channel 14 within the wall of the shrink fit chuck head 6 past the tool shaft to the front end of the shrink fit chuck head 6. This can be performed, for example, by two bore holes, which are disposed mirror symmetrical with reference to the longitudinal axis of the tool holder I, which extend in the end section 7 next to the tool shaft in the wall.

Figure 2:
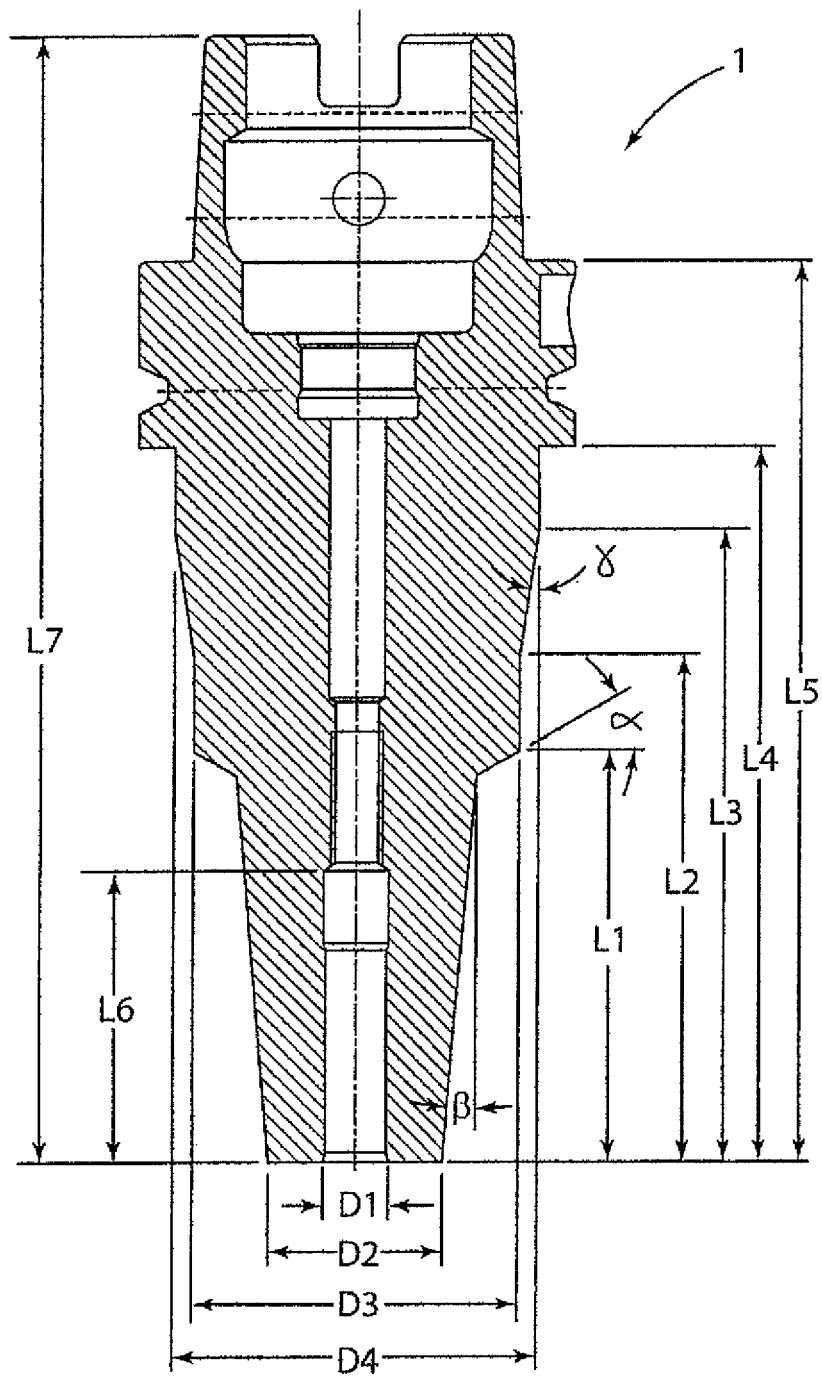
FIG. 2 gives explanations with respect to the dimensions of the tool holder of FIG. 1.

In FIG. 2, the tool holder 1 of FIG. 1 is illustrated again in longitudinal cross section, wherein however particular dimensions are defined more precisely. The subsequent tables give exemplary values for the particular dimensions. All these values are given in mm or in ° for the dimensions α, β, and γ, and are listed depending on the type of tool holder coupling shaft 2 and depending on the shrink fit chuck length L4.

All dimensions relate to a lower diameter D4 of the shrink fit chuck base 5 of 50 mm or 53 mm, which is predetermined according to the standard by the choice of the machine tool interface. Thus, the tables 1, 2, 3, and 4 are only provided up to a tool shaft diameter D1 of 16 mm, since in larger tool shaft diameters D1, such a discontinuous transition 11 substantially cannot be accomplished with standard materials. In order to provide rotation stable tool holders also for larger tool shaft diameters D1 according to the present invention, thus with the described contour for applications in high speed ranges, larger interfaces have to be used, which allow greater diameters D4 of the fourth section 10.

The angular values for the dimensions $\alpha$, $\beta$ and $\gamma$ depend on the selection of the total shrink fit chuck length L4 and on the diameter D4 of the shrink fit chuck base 5. Therefore, they are constant respectively in the tables 1, 2, 3, and 4.

TABLE 1

| D1 | D2 | D3 | D4 | L1 | L2 | L3 | L4 | L5 | L5 | L7 | $\alpha$ | $\beta$ | $\gamma$ |
|----|----|----|----|------|------|----|-----|----|----|-----|----|-----|---|
| 6  | 21 | 40 | 53 | 48.5 | 60.5 | 84 | 104 | 130 | 38 | 162 | 30 | 4.5 | 6 |
| 8  | 21 | 40 | 53 | 48.5 | 60.5 | 84 | 104 | 130 | 38 | 162 | 30 | 4.5 | 6 |
| 10 | 24 | 40 | 53 | 55   | 65.5 | 84 | 104 | 130 | 43 | 162 | 30 | 4.5 | 6 |
| 12 | 24 | 40 | 53 | 55   | 65.5 | 84 | 104 | 130 | 48 | 162 | 30 | 4.5 | 6 |
| 14 | 27 | 42 | 53 | 60.5 | 70.5 | 84 | 104 | 130 | 48 | 162 | 30 | 4.5 | 6 |
| 16 | 27 | 42 | 53 | 60.5 | 70.5 | 84 | 104 | 130 | 51 | 162 | 30 | 4.5 | 6 |

Table 1 lists dimensional values for a tool holder 1 with a hollow shaft coupling 2 for a first shrink fit chuck length L4.

TABLE 2

| D1 | D2 | D3 | D4 | L1 | L2 | L3 | L4 | L5 | L5 | L7 | $\alpha$ | $\beta$ | $\gamma$ |
|----|----|----|----|------|------|-----|-----|-----|----|-----|----|-----|---|
| 6  | 21 | 40 | 53 | 48.5 | 60.5 | 114 | 134 | 160 | 38 | 192 | 30 | 4.5 | 6 |
| 8  | 21 | 40 | 53 | 48.5 | 60.5 | 114 | 134 | 160 | 38 | 192 | 30 | 4.5 | 6 |
| 10 | 24 | 40 | 53 | 55   | 65.5 | 114 | 134 | 160 | 43 | 192 | 30 | 4.5 | 6 |
| 12 | 24 | 40 | 53 | 55   | 65.5 | 114 | 134 | 160 | 48 | 192 | 30 | 4.5 | 6 |
| 14 | 27 | 42 | 53 | 60.5 | 70.5 | 114 | 134 | 160 | 48 | 192 | 30 | 4.5 | 6 |
| 16 | 27 | 42 | 53 | 60.5 | 70.5 | 114 | 134 | 160 | 51 | 192 | 30 | 4.5 | 6 |

Table 2 lists dimensional values for a tool holder 1 with a hollow shaft coupling 2 for a second shrink fit chuck length L4.

TABLE 3

| D1 | D2 | D3 | D4 | L1 | L2 | L3 | L4 | L5 | L5 | L7 | $\alpha$ | $\beta$ | $\gamma$ |
|----|----|----|----|------|------|----|-------|-----|----|-------|----|-----|---|
| 6  | 21 | 40 | 50 | 48.5 | 60.5 | 91 | 110.9 | 130 | 38 | 198.4 | 30 | 4.5 | 8 |
| 8  | 21 | 40 | 50 | 48.5 | 60.5 | 91 | 110.9 | 130 | 38 | 198.4 | 30 | 4.5 | 8 |
| 10 | 24 | 40 | 50 | 55   | 65.5 | 91 | 110.9 | 130 | 43 | 198.4 | 30 | 4.5 | 8 |
| 12 | 24 | 40 | 50 | 55   | 65.5 | 91 | 110.9 | 130 | 48 | 198.4 | 30 | 4.5 | 8 |
| 14 | 27 | 42 | 50 | 60.5 | 70.5 | 91 | 110.9 | 130 | 48 | 198.4 | 30 | 4.5 | 8 |
| 16 | 27 | 42 | 50 | 60.5 | 70.5 | 91 | 110.9 | 130 | 51 | 198.4 | 30 | 4.5 | 8 |

Table 3 lists dimensional values for a tool holder 1 with a steep cone shaft coupling (not shown) for a first shrink fit chuck length L4, wherein the shape of the tool holder 1 with steep cone shaft coupling only differs from the shape of a tool holder 1 with hollow shaft coupling 2 in the portion of the coupling shaft and in the portion of the center section.

TABLE 4

| D1 | D2 | D3 | D4 | L1 | L2 | L3 | L4 | L5 | L5 | L7 | $\alpha$ | $\beta$ | $\gamma$ |
|----|----|----|----|------|------|-----|-------|-----|----|-------|----|-----|---|
| 6  | 21 | 40 | 50 | 48.5 | 60.5 | 121 | 140.9 | 160 | 38 | 228.4 | 30 | 4.5 | 8 |
| 8  | 21 | 40 | 50 | 48.5 | 60.5 | 121 | 140.9 | 160 | 38 | 228.4 | 30 | 4.5 | 8 |
| 10 | 24 | 40 | 50 | 55   | 65.5 | 121 | 140.9 | 160 | 43 | 228.4 | 30 | 4.5 | 8 |
| 12 | 24 | 40 | 50 | 55   | 65.5 | 121 | 140.9 | 160 | 48 | 228.4 | 30 | 4.5 | 8 |
| 14 | 27 | 42 | 50 | 60.5 | 70.5 | 121 | 140.9 | 160 | 48 | 228.4 | 30 | 4.5 | 8 |
| 16 | 27 | 42 | 50 | 60.5 | 70.5 | 121 | 140.9 | 160 | 51 | 228.4 | 30 | 4.5 | 8 |

Table 4 lists dimensional values for a tool holder 1 with a steep cone shaft coupling (not shown) for a second shrink fit chuck length L4.

Figure 3:
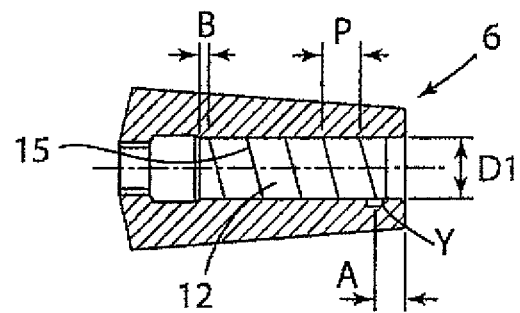
FIG. 3 shows the interior configuration of the receiver in the preferred embodiment according to FIG. 1.
Figure 4:
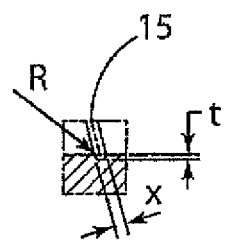
FIG. 4 shows a detail of FIG. 3.

According to FIG. 3 and to the detailed illustration in FIG. 4, a groove 15 can be provided within the inner bore hole 12 in the tool holder 1 according to the invention, which partially enlarges the inner diameter of the inner bore hole 12 in the form of indentations. Instead of one groove, several grooves can also be provided. After the shrink fitting of the tool shaft into the inner bore hole 12 has been performed, the inner bore hole 12 is thereby not in direct physical contact with the tool shaft in the section of these grooves, so that cavities are formed in these sections, which advantageously receive humidity, lubricants, and similar adhering to the tool shaft, so that no hydraulic supports can form between the inner bore hole 12 and the tool shaft, which would hinder a complete torque transfer. Instead of several grooves (for example, extending in parallel or in radial direction relative to the axis), a spiral shaped groove 15 can be provided.

This groove 15 does not only extend over the entire portion of the inner bore hole 12 but it ends at a distance A in front of the front end of the fit and at a distance B in front of its rear end. This way, the tightness of the fit is assured. Otherwise, the coolant could escape through the one or through the several grooves in case of an internal coolant supply, so that a pressure loss could occur.

TABLE 5

| D1 | A | B | P | t | x | R |
|---|---|---|---|---|---|---|
| 6 | 3 | 2 + 1 | 7 | 0.04 + 0.05 | 0.6 | 0.8 |
| 8 | 3 | 2 + 1 | 8 | 0.04 + 0.05 | 0.6 | 0.8 |
| 10 | 3 | 2 + 1 | 8 | 0.04 + 0.05 | 0.6 | 0.8 |
| 12 | 3 | 2 + 1 | 9 | 0.04 + 0.05 | 0.6 | 0.8 |
| 14 | 3 | 2 + 1 | 9 | 0.04 + 0.05 | 0.6 | 0.8 |
| 16 | 3 | 2 + 1 | 10 | 0.06 + 0.05 | 0.8 | 1.1 |

Table 5 lists dimensional values for various diameters D1 of the inner bore hole 12 for the distances A and B of the groove 15 from the ends of the fit of the inner bore hole 12, for the turn elevation increase P, the depth t, the width x, and the diameter R of the groove 15 according to FIG. 3 and FIG. 4.

From the above it has become evident that a tool holder 1 according to the present invention is much less prone to vibration than the state of the art tool holder. This allows among other things higher speeds, so that the stock removing performance, which is determined by the speed of the tool, the feed of the tool, and the cutting depth of the tool, can be increased, and thus the machine tool operating times required for producing a work piece can be reduced simultaneously. Consequently, a much more efficient and economical production and machining of work pieces is possible with the tool holder according to the present invention.

The above description is considered that of the preferred embodiment(s) only. Modification of the invention will occur to those skilled in the art and to those who make or use the invention. Therefore, it is understood that the embodiment(s) shown in the drawings and described above are merely for illustrative purposes and not intended to limit the scope of the invention, which is defined by the following claims as interpreted according to the principles of patent law, including the doctrine of equivalents.

What is claimed is:

1. A unitary, one piece tool holder for shrink fit mounting of a tool having a cylindrical tool shaft, the unitary, one piece tool holder comprising:

a coupling shaft for coupling to a machine tool and a shrink fit chuck comprising a shrink fit chuck head and a shrink fit chuck base;

a central section disposed between the coupling shaft and the shrink fit chuck base;

wherein the shrink fit chuck comprises a clamping section in the shrink fit chuck head;

wherein the clamping section comprises a receiver having an interior bore hole for clamping the tool shaft therein;

wherein the shrink fit chuck further comprises a front diameter at the shrink fit chuck head and a rear diameter at the shrink fit chuck base;

wherein a surface connecting the front and rear diameter of the shrink fit chuck comprises at least two sections;

wherein a first section of the at least two sections is substantially conical and is disposed at the shrink fit chuck head and a second section of the at least two sections is substantially cylindrical and is disposed at the shrink fit chuck base, and wherein a transition from the first section to the second section is disposed between the shrink fit chuck head and the shrink fit chuck base;

wherein a surface diameter of the surface of the shrink fit chuck increases at the transition from the first to the second section at a first angle with reference to a line perpendicular to a longitudinal axis of the tool holder in a range of 10° to 50°, so that the shrink fit chuck comprises the shrink fit chuck head which is more slender than the shrink fit chuck base;

wherein the receiver comprises a stop for defining a position of a tool shaft within the receiver;

wherein the stop is at least one of, disposed such that an end of a tool shaft in a clamped position is disposed proximate an elevation of the transition, and disposed between the transition and a front end of the shrink fit chuck head;

wherein the interior bore hole has front and rear ends and defines a cylindrical inner surface having a spiral groove; and wherein the spiral groove is positioned distal from the front end of the interior bore hole by a first distance and distal from the rear end of the interior bore hole by a second distance.

2. A tool holder according to claim 1, wherein:
the first section extends between a front end of the shrink fit chuck head and the transition and comprises a substantially conical surface defining a diameter; and
the diameter of the substantially conical surface increases at a second angle with reference to a longitudinal axis of the tool holder in a range of 1° to 20°.

3. A tool holder according to claim 2, wherein:
the second angle is 4.5°.

4. A tool holder according to claim 1, wherein:
the first angle is in a range of 10° to 40°.

5. A tool holder according to claim 4, wherein:
the first angle is 30°.

6. A tool holder according to claim 1, wherein:
a third section is disposed between the central section and the second section and
wherein the third section comprises a cylindrical surface and a diameter of a surface of the second section expands via a conical fourth section extending at a second angle with reference to the tool holder longitudinal axis in a range of 1° to 20°.

7. A tool holder according to claim 6, wherein:
the second angle is 6°.

8. A tool holder according to claim 6, wherein:
the second angle is 8°.

9. A tool holder according to claim 1, wherein:
a third section is disposed between the central section and the second section;
wherein a fourth section is disposed between the central section and the third section; and
wherein the second and fourth sections comprise substantially cylindrical surfaces and the third section comprises a substantially conical surface, wherein the surface of the third section defines a second angle relative to a longitudinal axis of the tool holder in a range of 1°-20°.

10. A tool holder according to claim 9, wherein:
the second angle is 6°.

11. A tool holder according to claim 9, wherein:
the second angle is 8°.

12. A tool holder according to claim 1, wherein:
an inner bore hole is provided in an interior of the tool holder as a supply channel for coolant.

13. A tool holder according to claim 12, wherein:
the supply channel has a diameter in the range of 3 mm to 6 mm.

* * * * *

UNITED STATES PATENT AND TRADEMARK OFFICE
CERTIFICATE OF CORRECTION

Page 1 of 1

PATENT NO.        : 8,821,085 B2
APPLICATION NO.   : 12/065976
DATED             : September 2, 2014
INVENTOR(S)       : Franz Haimer et al.

It is certified that error appears in the above-identified patent and that said Letters Patent is hereby corrected as shown below:

In The Specification

Column 1
Lines 43-44, "DE 202 00 298 U1" should be --DE 202 00 398 U1--.

Column 4
Line 36, "said" should be --the--.

Column 6
Line 11, "L5" (second occurrence) should be --L6--.
Line 20, "L5" (second occurrence) should be --L6--.
Line 39, "L5" (second occurrence) should be --L6--.
Line 56, "L5" (second occurrence) should be --L6--.

Signed and Sealed this
Twentieth Day of January, 2015

Michelle K. Lee
*Deputy Director of the United States Patent and Trademark Office*